United States Patent
Deshpande et al.

(10) Patent No.: US 10,616,299 B2
(45) Date of Patent: Apr. 7, 2020

(54) VIDEO ANALYTICS DEVICE

(71) Applicant: Accenture Global Solutions Limited, Dublin (IE)

(72) Inventors: Ketaki Deshpande, Gurgaon (IN); Muthumari Shanmugasundaram, Bangalore (IN); Ruchika Sachdeva, Delhi (IN); Laura Chittick, London (GB); Youssef D. Tuma, London (GB); Jonathan Saginaw, New York, NY (US); Juhi Munjal, Delhi (IN); Michael Baldino, III, Centennial, CO (US); Jonathan Stribley, Ann Arbor, MI (US); Kaushik Sanyal, Bangalore (IN); Arnab D. Chakraborty, Bangalore (IN); Deepthi Adimulam, Hyderabad (IN)

(73) Assignee: Accenture Global Solutions Limited, Dublin (IE)

( * ) Notice: Subject to any disclaimer, the term of this patent is extended or adjusted under 35 U.S.C. 154(b) by 105 days.

(21) Appl. No.: 15/241,537

(22) Filed: Aug. 19, 2016

(65) Prior Publication Data

US 2017/0289226 A1    Oct. 5, 2017

(30) Foreign Application Priority Data

Mar. 30, 2016   (IN) .............................. 201641011079

(51) Int. Cl.
*H04L 29/06* (2006.01)
*H04L 12/24* (2006.01)
(Continued)

(52) U.S. Cl.
CPC ........... *H04L 65/601* (2013.01); *G06N 20/00* (2019.01); *H04L 41/142* (2013.01);
(Continued)

(58) Field of Classification Search
CPC ... H04L 65/601; H04L 41/0803; H04L 43/16; H04N 21/23418; H04N 21/2387; G06N 99/005

See application file for complete search history.

(56) References Cited

U.S. PATENT DOCUMENTS 6,493,721 B1 * 12/2002 Getchius ................. G06Q 30/02
8,990,201 B1 *  3/2015 Johnston ............. G06F 16/3322
                                                707/736
(Continued)

FOREIGN PATENT DOCUMENTS

WO    WO 2012/148770 A2    11/2012

OTHER PUBLICATIONS

Kim et al. "An Automatic Recommendation Scheme of Tv Program Contents for (IP) TV Personalization", IEEE Transactions on Broadcasting vol. 57, No. 3 Sep. 3, 2011. pp. 671-684 (Year: 2011).*

(Continued)

*Primary Examiner* — Uzma Alam
(74) *Attorney, Agent, or Firm* — Harrity & Harrity, LLP

(57) ABSTRACT

A device may communicate with a group of devices to obtain data regarding a set of events occurring for the group of devices. The device may process the data regarding the set of events to remove a subset of data entries, from the data, that is associated with an anomalous event. A first layer of analysis may relate to the group of devices, a second layer of analysis relating to a set of sessions of operating a user interface via the group of devices, and a third layer of analysis relating to information provided via the user interface. The device may perform the multiple layers of analysis via a machine learning technique to identify an alteration relating to the information provided via the user interface.

(Continued)

The device may alter the information provided via the user interface based on performing the multiple layers of analysis.

20 Claims, 10 Drawing Sheets

(51) Int. Cl.
      *G06N 20/00* (2019.01)
      *H04N 21/442* (2011.01)
      *H04L 29/08* (2006.01)
      *H04N 21/25* (2011.01)
      *H04N 21/258* (2011.01)
      *H04N 21/24* (2011.01)
      *H04N 21/658* (2011.01)

(52) U.S. Cl.
    CPC ............ *H04L 41/145* (2013.01); *H04L 41/16* (2013.01); *H04L 67/10* (2013.01); *H04L 67/14* (2013.01); *H04N 21/2407* (2013.01); *H04N 21/252* (2013.01); *H04N 21/25866* (2013.01); *H04N 21/44222* (2013.01); *H04N 21/6582* (2013.01)

(56) References Cited

U.S. PATENT DOCUMENTS

| | | | | |
|---|---|---|---|---|
| 8,990,352 | B1* | 3/2015 | Kosslyn | G06F 12/06 709/219 |
| 2002/0152305 | A1* | 10/2002 | Jackson | H04L 41/5035 709/224 |
| 2005/0289193 | A1* | 12/2005 | Arrouye | G06F 16/134 |
| 2006/0095422 | A1* | 5/2006 | Kikuchi | G06F 16/957 |
| 2006/0123448 | A1* | 6/2006 | Ma | H04N 21/41407 725/51 |
| 2006/0163358 | A1* | 7/2006 | Biderman | H04L 67/1095 235/472.01 |
| 2007/0112575 | A1* | 5/2007 | Savoor | G06Q 10/06375 705/7.34 |
| 2007/0157222 | A1* | 7/2007 | Cordray | H04H 60/33 725/13 |
| 2007/0186269 | A1* | 8/2007 | Malik | H04N 7/17318 725/135 |
| 2007/0214477 | A1* | 9/2007 | Read | H04N 21/2381 725/38 |
| 2007/0266403 | A1* | 11/2007 | Ou | G06Q 30/02 725/46 |
| 2008/0120165 | A1* | 5/2008 | Yan | G06Q 30/02 705/342 |
| 2008/0263633 | A1* | 10/2008 | Banga | G06Q 30/02 726/3 |
| 2008/0307454 | A1* | 12/2008 | Ahanger | G06Q 30/02 725/36 |
| 2009/0019488 | A1* | 1/2009 | Ruiz-Velasco | G06F 3/0482 725/43 |
| 2009/0133048 | A1* | 5/2009 | Gibbs | G06F 16/48 725/14 |
| 2010/0138867 | A1* | 6/2010 | Wong | H04N 5/4403 725/46 |
| 2011/0078775 | A1* | 3/2011 | Yan | G06F 21/57 726/6 |
| 2011/0131168 | A1* | 6/2011 | Fukazawa | G06F 16/435 706/46 |
| 2011/0289116 | A1* | 11/2011 | Horadan | G06F 21/10 707/781 |
| 2014/0012982 | A1* | 1/2014 | Li | H04N 21/44222 709/224 |
| 2014/0280109 | A1* | 9/2014 | Zomet | G06F 16/3323 707/728 |
| 2014/0289753 | A1* | 9/2014 | White | H04N 7/173 725/14 |
| 2015/0193816 | A1* | 7/2015 | Toupet | G06Q 30/0251 705/14.43 |
| 2015/0220979 | A1* | 8/2015 | Ouimet | G06Q 30/0251 705/14.49 |
| 2015/0317683 | A1* | 11/2015 | Yerli | G06Q 30/0261 705/14.58 |
| 2015/0348095 | A1* | 12/2015 | Dixon | G06Q 30/0246 705/14.45 |
| 2015/0382041 | A1* | 12/2015 | Lee | H04N 21/2668 725/51 |
| 2016/0142272 | A1* | 5/2016 | Stringham | H04L 43/04 709/224 |
| 2016/0277407 | A1* | 9/2016 | Nakashima | G06F 21/00 |
| 2016/0292428 | A1* | 10/2016 | Brady | G06F 21/10 |
| 2016/0371464 | A1* | 12/2016 | Bricker | A24F 47/00 |
| 2017/0236060 | A1* | 8/2017 | Ignatyev | G06F 16/2365 706/46 |

OTHER PUBLICATIONS

Zhang et al., "Personalized online sales using web usage data mining", Computers in Industry, vol. 58, Issue 8-9, Dec. 2007, 38 pages.
Bounsaythip et al., "Overview of Data Mining for Customer Behavior Modeling", VTT Information Technology, Research Report TTE1-2001-18, Version 1, Jun. 29, 2001, 59 pages.
Hakala et al., "The Role of Log Entries in the Quality Control of Video Distribution", Mobile Multimedia Communications—7th International (ICST) Conference, Sep. 2011, pp. 168-179.
Koyun et al., "Logging Model for Windows Media Services", http://www.microsoft.com/windows/windowsmedia/howto/articles/LoggingaModel.aspx, 2007, 34 pages.
Gopalakrishnann et al., "Two Level Clustering of Web Logic Files to Enhance the Quality of User Data", International Journal of Advanced Engineering Technology, vol. VII, Issue II, Apr. 2016, pp. 1138-1144.
Aghabozorgi et al., "Dynamic Modeling by Usage Data for Personalization Systems", 13th International Conference Information Visualization, Jul. 2009, 6 pages.
Suneetha et al., "Identifying User Behavior by Analyzing Web Server Access Log File", IJCSNS International Journal of Computer Science and Network Security, vol. 9, No. 4, Apr. 2009, pp. 327-332.
Kim et al., "An Automatic Recommendation Scheme of TV Program Contents for (IP) TV Personalization", IEEE Transactions on Broadcasting, vol. 57, No. 3, Aug. 2011, 11 pages, XP011381304.
Dobrian et al., "Understanding the Impact of Video Quality on User Engagement", SIGCOMM, Aug. 2011, 12 pages, XP058006665.
Extended European Search Report corresponding to EP 17 16 3725, dated Aug. 17, 2017, 14 pages.
Wikipedia, "Google Analytics," https://en.wikipedia.org/wiki/Google_Analytics, Aug. 8, 2016, 7 pages.
ComScore, "Enterprise Analytics," http://www.comscore.com/Products/Enterprise-Analytics?cs_edgescape_cc=US, Jun. 3, 2016, 2 pages.
Sajeev, G. P. et al: "Effective Web Personalization System Based on Time and Semantic Relatedness", 2016 International Conference on Advances in Computing, Communications and Informatics (ICACCI), Sep. 21-24, 2016, Jaipur, India, pp. 1391-1396.

* cited by examiner

User: ADAM123

RFM Score: 46/100
User Type: Marathon Viewer
Sports Engagement: 23
GEC Engagement: 58
Movie Engagement: 52

<u>Actions</u>
- Alter advertisement campaign
  - New advertisement every 22 min
- Recommend Playlist
  - News Program A
  - Action Movie A
  - Action Movie B
  - Action Movie C

FIG. 5E

VIDEO ANALYTICS DEVICE

RELATED APPLICATION

This application claims priority under 35 U.S.C. § 119 to Indian Patent Application No. 201641011079, filed on Mar. 30, 2016, the content of which is incorporated by reference herein in its entirety.

BACKGROUND

A content provider may provide content (e.g., audio content, video content, or audio-video content) via a content platform. For example, the content provider may utilize the content platform to provide an over-the-top (OTT) television program, a movie, an audiobook, or the like. A user device may utilize the content platform to provide the content for viewing, listening, or the like. The content provider may receive data indicating a quantity of user devices receiving a particular item of content via the video platform, and may utilize the data to determine a popularity of the item of content.

SUMMARY

According to some possible implementations, a device may include one or more processors. The one or more processors may communicate with a group of devices to obtain data regarding a set of events occurring for the group of devices. The one or more processors may process the data regarding the set of events to remove a subset of data entries, from the data, that is associated with an anomalous event. The anomalous event may be associated with a threshold deviation from other events of the set of events. A first layer of analysis may relate to the group of devices, a second layer of analysis relating to a set of sessions of operating a user interface via the group of devices, and a third layer of analysis relating to information provided via the user interface. The one or more processors may perform the multiple layers of analysis via a machine learning technique to identify an alteration relating to the information provided via the user interface. The one or more processors may alter the information provided via the user interface based on performing the multiple layers of analysis.

According to some possible implementations, a non-transitory computer-readable medium may store one or more instructions that, when executed by the one or more processors may cause the one or more processors to obtain content data from a group of user devices. The content data may relate to a content platform associated with providing playback of content via the group of user devices. The one or more instructions, when executed by the one or more processors may process the content data to alter a portion of the content data. The one or more instructions, when executed by the one or more processors may alter the content data including removing a group of data entries including an error or completing an incomplete group of data entries. The one or more instructions, when executed by the one or more processors may generate an analytical data model relating to user engagement with content based on one or more portions of the content data relating to the group of user devices, a session of operation of the content platform, or an item of content based on processing the content data. The one or more instructions, when executed by the one or more processors may select, for a particular user associated with a particular user device of the group of user devices, a particular item of content for playback based on the analytical data model relating to user engagement with content. The one or more instructions, when executed by the one or more processors may cause the particular item of content to be provided via the content platform of the particular user device.

According to some possible implementations, a method may include providing, by a device, a video platform to a group of user devices for playback of items of content. The items of content may be videos. The method may include receiving, by the device, content data, from the group of user devices, relating to the playback of items of content via the video platform. The content data may include event data identifying one or more interruptions to the playback of video items. The method may include determining, by the device, a set of characteristics associated with a particular user of a particular user device, of the group of user devices, based on the content data associated with the group of user devices. The method may include causing, by the device, an alteration to a playback parameter based on the set of characteristics associated with the particular user.

BRIEF DESCRIPTION OF THE DRAWINGS

FIGS. 5A-5E are diagrams of an example implementation relating to the example process shown in FIG. 4.

DETAILED DESCRIPTION

Figure 1:
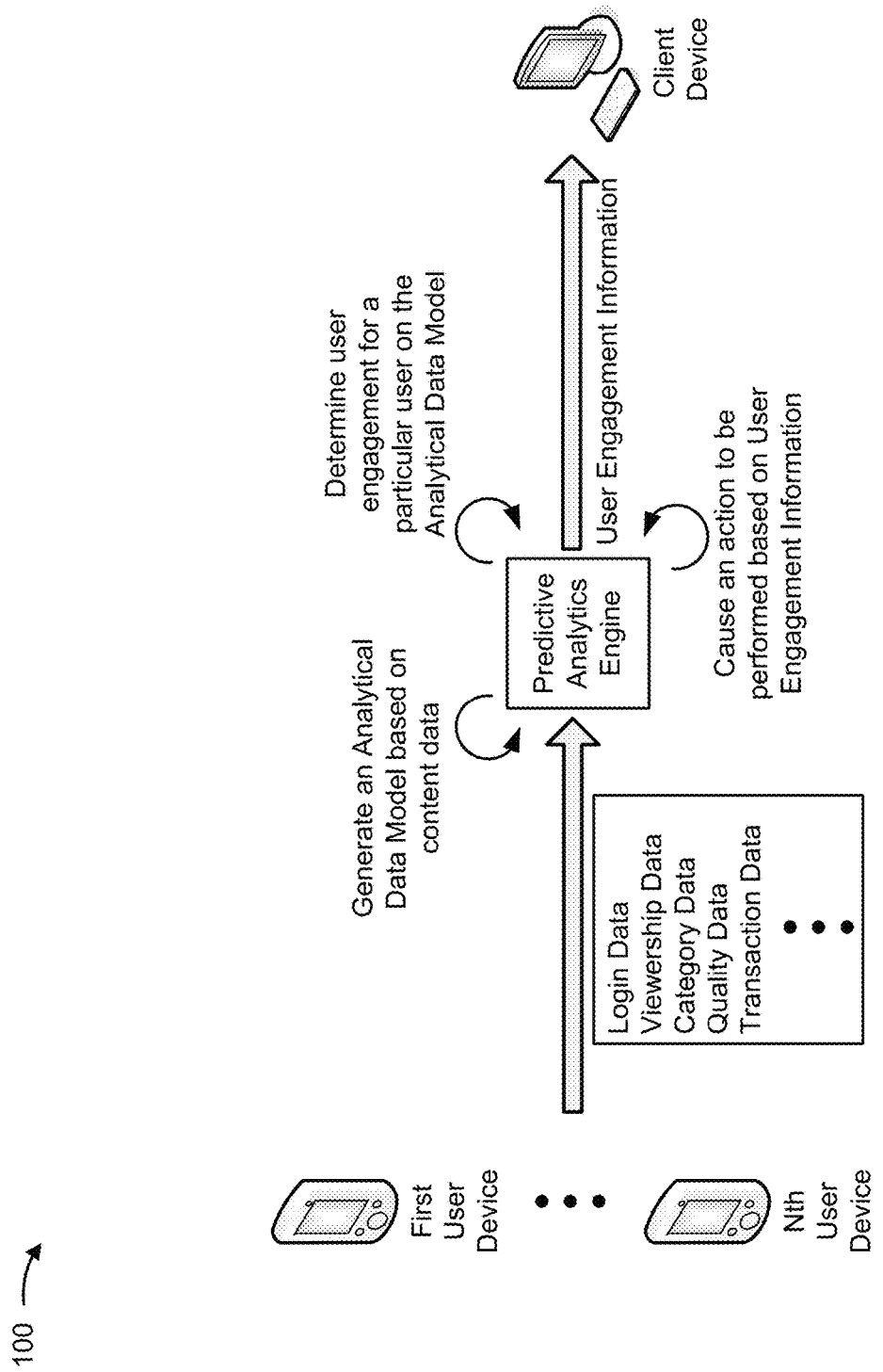
FIG. 1 is a diagram of an overview of an example implementation described herein.

The following detailed description of example implementations refers to the accompanying drawings. The same reference numbers in different drawings may identify the same or similar elements.

A user device may utilize a content platform to provide items of content. For example, the user device may provide a movie, a television program, an audio program, or the like using the content platform. A content provider may collect information regarding a quantity of user devices receiving a particular item of content. For example, the content provider may operate a content server to provide, to a set of user devices, an over-the-top (OTT) television program for display via the content platform. The content provider may receive, from the content server, a log file including information identifying a quantity of user devices receiving a particular item of content.

The content provider may determine a popularity of an item of content based on the information included in the log file. For example, the content provider may determine that a first television program was accessed by a first quantity of users and a second television program was accessed by a second, smaller quantity of users, and may determine that the first television program is more popular than the second television program (e.g., that subsequent users are more likely to request the first television program). Similarly, the content provider may determine a user engagement with content based on information obtained from the content server. For example, the content provider may receive a log file indicating that a particular user accessed a set of movies, and may determine that the user is likely to enjoy one or more movies similar to the set of movies.

However, information obtained from a content server log file may fail to include information relevant to user engagement with a particular item of content and popularity of the particular item of content. For example, a user device may provide, for display to a user, a relatively small portion of a movie before ceasing playback because the user does not enjoy the movie, because the playback included multiple buffering periods resulting in a poor user experience, because the user device received a phone call resulting in the user being unable to continue watching, or the like. In each case, the content server may, based on the relatively small portion of the movie failing to satisfy a duration threshold, conclude that the user does not enjoy the movie, but this may be incorrect when the user ceased playback as a result of the poor user experience or the inability to continue watching.

Incorrect determinations of user engagement with a particular item of content or the popularity of the particular item of content may result in relatively poor network or device performance. For example, when a content provider incorrectly determines which items of content a user enjoys or does not enjoy, the content provider may provide inaccurate recommendations regarding a first other item of content that the user is predicted to enjoy. In this case, the content provider may provide the first other item of content, the user may decide that the first other item of content is not enjoyable and request a second other item of content, and the content provider may be caused to provide the second other item of content. Providing multiple other items of content may result in a greater utilization of network resources (e.g., associated with buffering both the first other item of content and a second other item of content) and/or processing resources (e.g., associated with obtaining and providing multiple items of content) relative to providing a single item of content.

Similarly, when the content provider incorrectly determines that a first item of content is more popular (e.g., more likely to be requested by other users) than a second item of content, the content provider may allocate a greater quantity of network resources, memory resources, and/or processing resources to provide the first item of content than the second item of content. In this case, if subsequent users request the second item of content more frequently than the first item of content, the lesser resource allocation toward the second item of content may result in poor playback performance, wasted network bandwidth (e.g., an excessive allocation of network resources to providing the first item of content), or the like.

Implementations, described herein, may utilize content data obtained from a set of user devices to generate an analytical data model associated with user engagement with content. Moreover, implementations, described herein, may alter playback via a content platform based on the user engagement with content, such as by targeting the particular user for particular content, altering a resource allocation, altering a configuration of the video platform, or the like. Furthermore, implementations, described herein, may permit improved selection and targeting of content and/or advertisements by content providers, thereby permitting improved resource allocation relative to selection and targeting based on server-side log files.

In this way, a content provider may increase a likelihood that an item of content provided to a user is relevant to the user relative to performing selection and targeting for the user based on a server-side log file. Based on increasing the relevancy of provided content, implementations, described herein, reduce a quantity of network traffic relative to the user being provided multiple items of content that the user finds irrelevant and rejects. Moreover, utilization of processing resources is reduced relative to being required to obtain the multiple items of content that the user finds irrelevant and rejects. Furthermore, allocation of network and device resources may be performed more accurately relative to determining content popularity based on server-side log files.

FIG. 1 is a diagram of an overview of an example implementation 100 described herein. As shown in FIG. 1, example implementation 100 may include a set of user devices, a predictive analytics engine (herein referred to as an analytics device), and a client device. In some implementations, the analytics device may operate as a resource of a cloud server and/or cloud network. For example, a cloud server may allocate processing resources for the predictive analytics engine.

As shown in FIG. 1, the analytics device may receive content data associated with a content platform operating on the set of user devices. For example, the analytics device may cause the set of user devices to log information relating to playback of content via the set of user devices, and may cause the set of user devices to provide the logged information to the analytics device for processing. Additionally, or alternatively, the analytics device may receive viewership data (e.g., information relating to playback of content during a session of a content platform), category data (e.g., information identifying characteristics of an item of content), quality data (e.g., information identifying metrics relating to quality of playback of an item of content), transaction data (e.g., information identifying a purchase of an item of content), or the like. Additionally, or alternatively, the analytics device may receive data relating to an event logged via a user device of the set of user devices (e.g., logged via the content platform), such as information indicating that a call was received via the user device, information identifying calendar entries stored via the user device, or the like.

The analytics device may process the content data to generate an analytical data model associated with user engagement with items of content. The analytical data model may include a set of classifications relating to user engagement with content, such as an identification of a set of clusters of users associated with similar content platform usage characteristics, an identification of user preferences relating to content, an identification of content popularity, or the like. In some implementations, the analytics device may process the data by performing data cleaning to remove duplicate data entries of the content data, to remove incomplete data entries, to complete incomplete data entries, or the like.

In some implementations, the analytics device may process the data by performing a business variables creation operation. The business variables creation operation may refer to obtaining a set of metrics associated with a particular granularity, such as data entries relating to content level behavior, data entries relating to device level behavior, data entries relating to session level behavior, or the like, based on the content data. For example, the analytics device may determine, for a particular item of content, a set of content level metrics, such as a quantity of viewers, a content of repeat viewers, a consumption percentage per viewing, a completion percentage per viewing, or the like. Based on content data indicating quality metrics or logged events affecting playback of content, the analytics device may alter the content level metrics, such as by removing data indicating that playback of a movie occurred for a relatively short period of time based on a logged event indicating that a corresponding user device experienced a network outage causing the playback to be stopped. In this way, the analytics device determines metrics regarding content with a greater degree of granularity than based on server-side logs relating to providing content.

Similarly, the analytics device may determine a set of device level metrics, for a particular user device, such as an average consumption time per session, a genre distribution of requested items of content, a time-of-day distribution for utilizing the content, or the like. Similarly, the analytics device may determine a set of session level metrics, for a particular session of utilizing the content platform, such as a session length, a genre distribution of content during the particular session, a quantity of items of content requested, an average duration for items of content, or the like. In this case, the analytics device may correlate the device level metrics or the session level metrics with a user profile of a user of the particular user device to determine a set of user preferences relating to items of content.

The analytics device may process the content data by applying a set of machine learning techniques to the set of metrics. For example, the analytics device may utilize a cluster generation technique to identify clusters of users associated with similar session characteristics and/or session level metrics. In this case, the analytics device may identify a first cluster of users associated with accessing a single item of content per session, a second cluster of users associated with accessing live events, or the like.

Additionally, or alternatively, the analytics device may generate a user engagement score relating to an amount of utilization of the content platform for playback based on device level metrics. In this case, the analytics device may identify relative low level engagement users who are associated with relatively infrequent logins and/or short sessions, relatively high level engagement users who are associated with relatively frequent logins and/or long sessions, or accelerator users who are associated with consistent consumption of a particular repeating item of content, such as episodes of a television series, or the like. Similarly, the analytics device may identify, for a particular user, a genre engagement score relating to a preference of a user for a particular genre of content, such as drama, sports, live events, or the like. Based on utilizing content data obtained from user devices, the analytics device can determine an effect of playback quality, interruptions, or the like on utilization of the content platform, thereby improving accuracy in utilizing the metrics to classify and analyze user behavior.

As further shown in FIG. 1, the analytics device may utilize the analytical data model to determine information relating to user engagement for a particular user utilizing a particular user device of the set of user devices. For example, the analytics device may determine, based on content data relating to the user, that sessions of the particular user device are associated with a particular cluster of session characteristics of the set of clusters. Additionally, or alternatively, the analytics device may determine a user engagement value associated with the particular user. Additionally, or alternatively, the analytics device may determine a genre engagement value associated with the particular user and a set of genres. The analytics device may generate a user interface including user engagement information for display via a client device, such as a content provider client device, an advertiser client device, or the like. In this way, the analytics device provides detailed analytics regarding consumers of content (e.g., the particular user). The analytics device may dynamically update the user interface to provide other information relating to user engagement, updated information relating to user engagement, or the like.

As further shown in FIG. 1, the analytics device may cause a set of actions to be performed based on the information relating to user engagement for the particular user. For example, the analytics device may generate a recommendation of a particular item of content, and may automatically cause the item of content to be transmitted to the particular user device for playback to the user. Additionally, or alternatively, the analytics device may select a particular advertisement for playback to a user, alter an advertisement frequency for playback to the user, alter a parameter associated with the content platform to improve playback performance for the user, or the like. Additionally, or alternatively, the analytics device may cause a particular resource allocation to be implemented based on the information relating to user engagement, such as allocating a particular bandwidth for providing content to the particular user, allocating a particular bandwidth for a particular item of content to be provided to a group of users utilizing a group of user devices, or the like.

In this way, the analytics device increases granularity with regards to user engagement determination based on utilizing information obtained from a video platform operating on a user device relative to utilizing a log generated by a content provider server. Moreover, based on increasing granularity of user engagement determinations, the analytics device increases a likelihood that a recommendation of an item of content is relevant to a user, thereby reducing a likelihood that a user rejects a recommended item of content and requests a different item of content. Based on reducing a quantity of items of content that are required to be provided, the analytics device reduces a quantity of network traffic and a utilization of processing resources relative to requiring a content provider server to provide multiple items of content.

As indicated above, FIG. 1 is provided merely as an example. Other examples are possible and may differ from what was described with regard to FIG. 1.

Although implementations, described herein, may be described in terms of a video platform and data relating to video content, implementations, described herein, may also be utilized with audio content, text-based content (e.g., a set of newspapers, books, or magazines), gaming content, interactive content, or the like.

Figure 2:
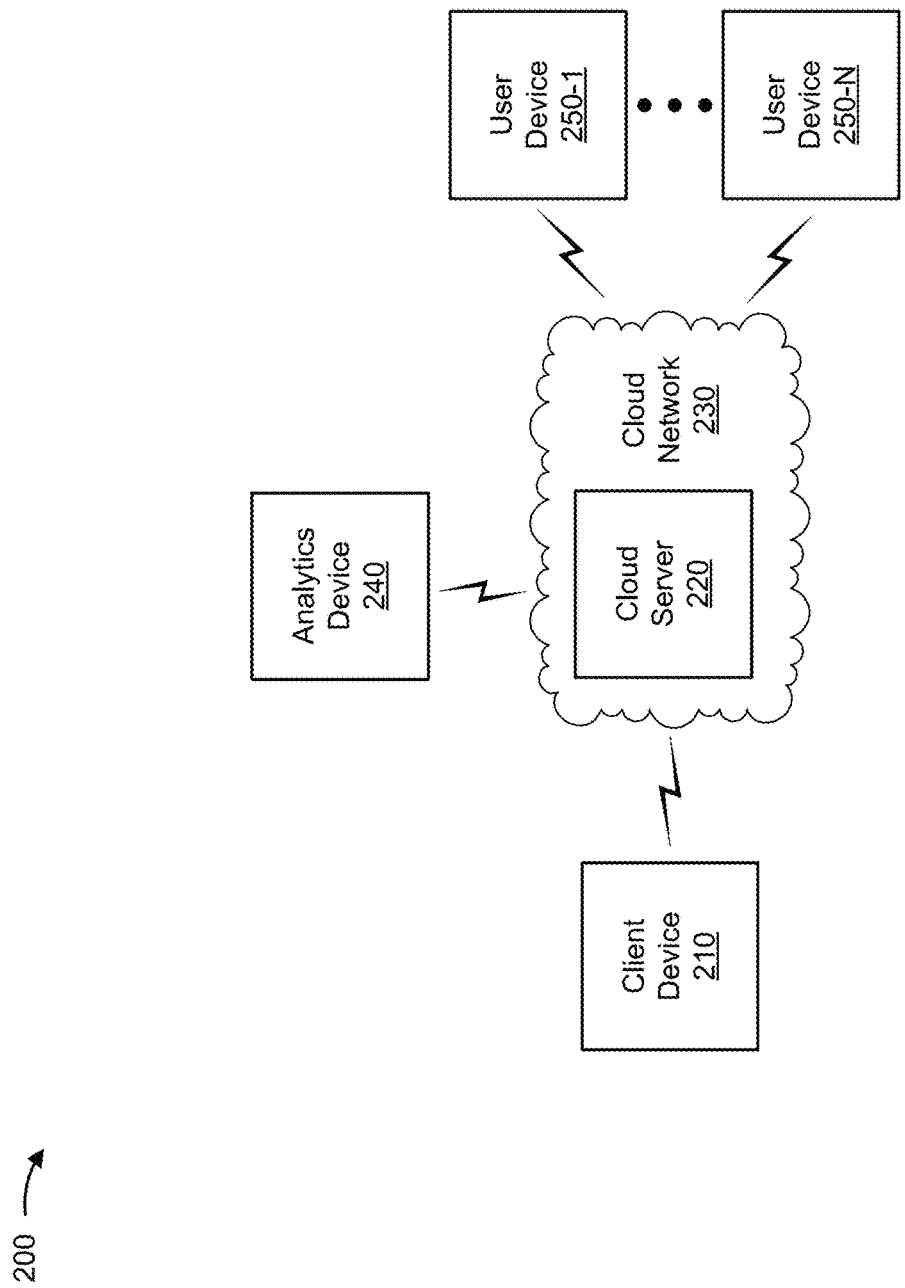
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a cloud server 220, a cloud network 230, an analytics device 240, and one or more user devices 250-1 through 250-N (N≥1) (hereinafter referred to herein individually as "user device 250" and collectively as "user devices 250"). Devices of environment 200 may interconnect via wired connections, wireless connections, or a combination of wired and wireless connections.

Client device 210 includes one or more devices capable of receiving, generating, storing, processing, and/or providing information associated with a content platform (e.g., a video platform). For example, client device 210 may include a communication and/or computing device, such as a mobile phone (e.g., a smart phone or a radiotelephone), a laptop computer, a tablet computer, a handheld computer, a gaming device, a wearable communication device (e.g., a smart wristwatch or a pair of smart eyeglasses), or a similar type of device. In some implementations, client device 210 may be caused to select, based on user engagement information, advertisements that are to be provided via a content platform, content that is provided via a content platform, or the like. In some implementations, client device 210 may provide analytics information relating to an item of content based on user engagement information. For example, analytics device 240 may provide, for display via client device 210, a user interface including information identifying a popularity of an item of content, information relating to engagement for a group of users or a particular user, or the like. In some implementations, client device 210 may receive information from and/or transmit information to another device in environment 200.

Cloud server 220 includes one or more devices capable of storing, processing, and/or routing information associated with a content platform (e.g., a video platform). For example, cloud server 220 may include a server that analyzes content data, received from user device 250, regarding a content platform and determines user engagement information. In some implementations, cloud server 220 may obtain and process content data to generate a dataset for determining user engagement information. In some implementations, cloud server 220 may include a communication interface that allows cloud server 220 to receive information from and/or transmit information to other devices in environment 200. While cloud server 220 will be described as a resource in a cloud computing network, such as cloud network 230, cloud server 220 may operate external to a cloud computing network, in some implementations.

Cloud network 230 includes an environment that delivers computing as a service, whereby shared resources, services, etc. may be provided by cloud server 220 to store, process, and/or route information associated with a content platform (e.g., a video platform). Cloud network 230 may provide computation, software, data access, storage, and/or other services that do not require end-user knowledge of a physical location and configuration of a system and/or a device that delivers the services (e.g., cloud server 220). As shown, cloud network 230 may include cloud server 220 and/or may communicate with client device 210, analytics device 240, and/or user device 250 via one or more wired or wireless networks.

Analytics device 240 includes one or more devices capable of receiving, generating, storing, processing, and/or providing information associated with a content platform (e.g., a video platform). For example, analytics device 240 may include a communication and/or computing device, such as a mobile phone (e.g., a smart phone or a radiotelephone), a computer (e.g., a laptop computer, a tablet computer, a handheld computer, or a desktop computer), a server device, a gaming device, a wearable communication device (e.g., a smart wristwatch or a pair of smart eyeglasses), or a similar type of device. In some implementations, analytics device 240 may include a set of modules, such as an analytics front end module (e.g., associated with providing a user interface including information identifying real-time trends regarding content, key performance indicators (KPIs) regarding content, predictive modeling regarding content, or real-time visualizations regarding content), a content platform module (e.g., associated with operating the content platform for each user device 250), or the like. In some implementations, analytics device 240 may alter content being provided via the content platform, such as selecting content for playback, configuring one or more playback parameters, or the like. In some implementations, analytics device 240 may receive information from and/or transmit information to another device in environment 200.

User device 250 includes one or more devices capable of receiving, generating, storing, processing, and/or providing information associated with a content platform (e.g., a video platform). For example, user device 250 may include a communication and/or computing device, such as a mobile phone (e.g., a smart phone or a radiotelephone), a laptop computer, a tablet computer, a handheld computer, a gaming device, a wearable communication device (e.g., a smart wristwatch or a pair of smart eyeglasses), or a similar type of device. In some implementations, user device 250 may log events associated with content playback via the content platform, and may provide information identifying the logged events for utilization in determining user engagement. For example, analytics device 240 may cause the content platform to log information relating to playback of content, and provide the logged information to analytics device 240 for analysis. In some implementations, user device 250 may receive information from and/or transmit information to another device in environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. For example, although cloud server 220 and analytics device 240 are described as separate devices, cloud server 220 and analytics device 240 may be implemented as a single device (e.g., a cloud server including computing resources allocated for performing functions associated with determining user engagement with an item of content, operating an analytics user interface, or operating a content platform). Additionally, or alternatively, a set of devices (e.g., one or more devices) of environment 200 may perform one or more functions described as being performed by another set of devices of environment 200.

Figure 3:
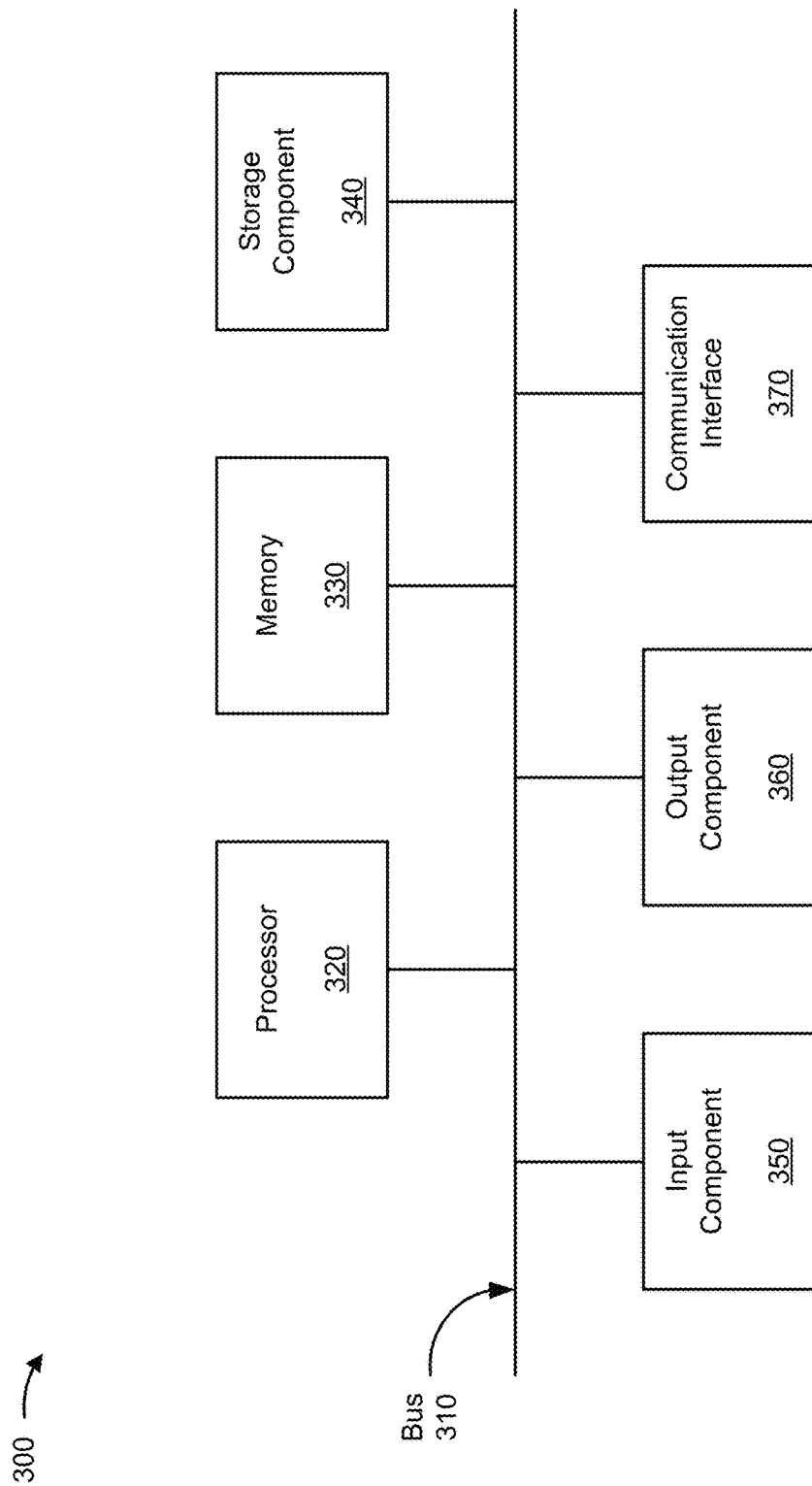
FIG. 3 is a diagram of example components of one or more devices of FIG. 2.

FIG. 3 is a diagram of example components of a device 300. Device 300 may correspond to client device 210, cloud server 220, analytics device 240, and/or user device 250. In some implementations, client device 210, cloud server 220, analytics device 240, and/or user device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
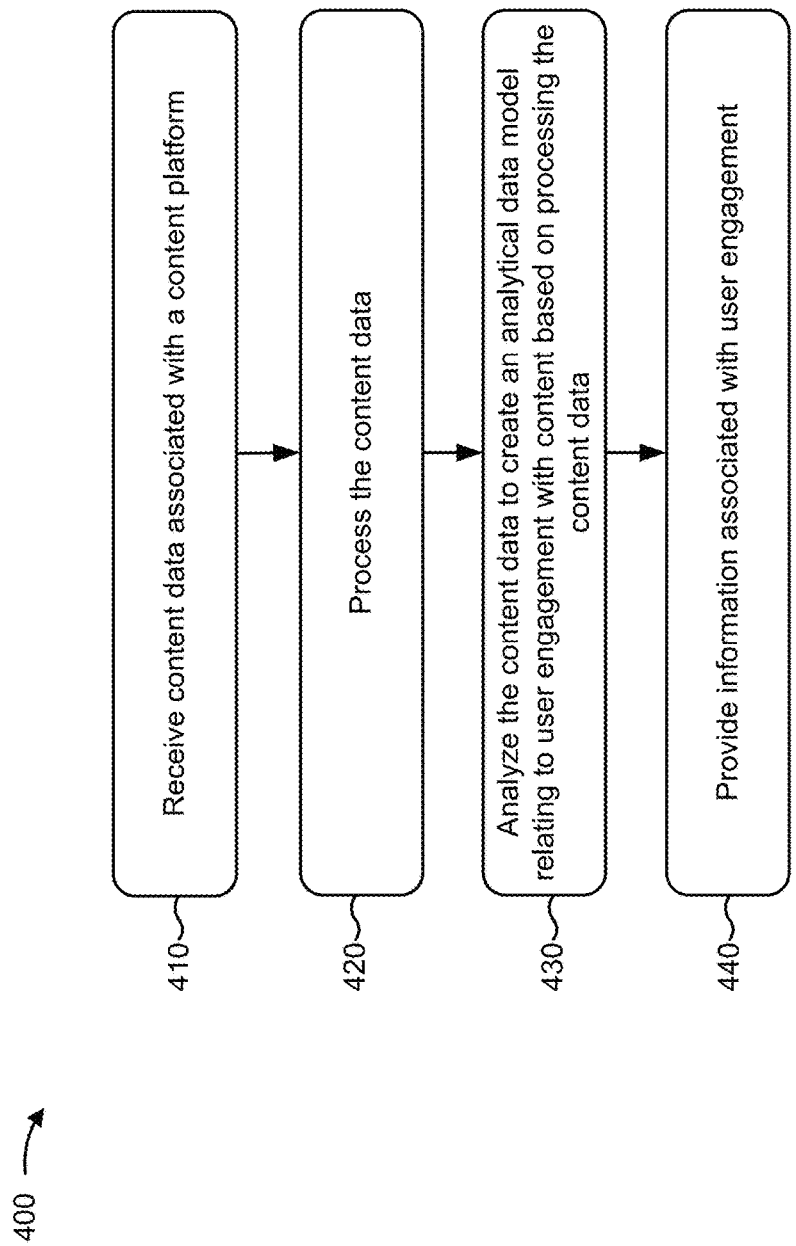
FIG. 4 is a flow chart of an example process for determining user engagement with content.

FIG. 4 is a flow chart of an example process 400 for generating an analytical data model relating to user engagement with content. In some implementations, one or more process blocks of FIG. 4 may be performed by analytics device 240. In some implementations, one or more process blocks of FIG. 4 may be performed by another device or a group of devices separate from or including analytics device 240, such as client device 210, cloud server 220, and/or user device 250.

As shown in FIG. 4, process 400 may include receiving content data associated with a content platform (block 410). For example, analytics device 240 may receive the content data associated with the content platform. In some implementations, analytics device 240 may receive the content data from user device 250 (e.g., via the content platform). For example, analytics device 240 may cause user device 250 to log events, information, or the like relating to playback of content via the content platform, and may cause user device 250 to provide the log in real-time, near real-time, or the like.

In some implementations, analytics device 240 may cause user device 250 to log a set of state transitions associated with a video platform operating via user device 250. For example, user device 250 may identify a transition from a first state to a second state, such as an authenticating state (e.g., a user has initiated authentication), a navigating state (e.g., a user is navigating the video platform), an initiating state (e.g., the video platform is initiating playback), a restarting state (e.g., playback is restarting based on an error or a user input), a buffering state (e.g., playback is buffering), a playing state (e.g., playback is occurring), a paused state (e.g., playback is paused), a scrubbing state (e.g., playback is being fast forwarded or rewinded), a closing state (e.g., playback is being stopped and the video platform is shutting down), or the like. In this case, analytics device 240 may provide, via the video platform, a set of application programming interface (API) calls associated with causing state transitions or events to occur, may cause user device 250 to log an API call and a timestamp associated with the API call, and may cause user device 250 to provide information identifying the API call and the timestamp.

Based on causing user device 250 to maintain a state machine and identify state transitions, analytics device 240 reduces a likelihood that errors are introduced into the content data as a result of incomplete log files, out of order information, or the like. Similarly, user device 250 may identify an event, such as a playback event (e.g., an ad starting, a bit rate changing, a video stopping, or a buffering starting), a non-playback event (e.g., an application programming interface (API) call, a login, an error, a purchase, or a download), or the like. In this case, user device 250 may log an API call associated with the event, and analytics device may utilize information identifying the API call to determine a status of user device 250 during playback of content.

In some implementations, analytics device 240 may cause user device 250 to provide the log periodically (e.g., in non-near real-time). For example, after a threshold period of time, analytics device 240 may transmit a request to user device 250 to cause user device 250 to provide content data. Additionally, or alternatively, analytics device 240 may cause another device to provide content data. For example, analytics device 240 may periodically obtain a log file from a content server associated with providing content to user device 250 for playback via the content platform. In this case, analytics device 240 may periodically request that the content server provide a log file storing content data, and may receive the log file based on transmitting the request.

In some implementations, analytics device 240 may receive content data relating to a data scheme. For example, analytics device 240 may identify a set of metrics to receive that relate to playback of content via the content platform, and may cause user device 250 to provide information identifying the set of metrics in a particular format associated with the data scheme.

In some implementations, analytics device 240 may receive content data relating to a login procedure associated with the content platform (e.g., login data). For example, analytics device 240 may receive login data identifying a login or logout attempt, a user identifier, a timestamp, a session identifier, a device identifier, a success indicator (e.g., whether a login or logout attempt was successful), a login failure description, or the like. Based on receiving the log file from user device 250 rather than a server-side log file, analytics device 240 may determine that a particular user, who is determined to have not used the content platform for a threshold period of time, is not an infrequent user but rather experienced login failures during the threshold period of time preventing utilization of the content platform.

Additionally, or alternatively, analytics device 240 may receive content data relating to viewership of content via the content platform (e.g., viewership data). For example, analytics device 240 may receive information identifying an item of content, a type of item of content (e.g., on-demand content, live content, or OTT content), a consumption duration (e.g., a length of time for which an item of content was provided), or the like. Additionally, or alternatively, analytics device 240 may receive content data relating to a categorization of an item of content provided via the content platform (e.g., category data). For example, analytics device 240 may receive information identifying a category type for the item of content (e.g., a general entertainment content (GEC) category, a movies category, or a sports category), a genre type for the item of content (e.g., a reality television type of content, a comedy movie type of content, or a soccer match type of content), a content duration for the item of content (e.g., a total duration), or the like.

Additionally, or alternatively, analytics device 240 may receive content data relating to a playback quality of content via the content platform (e.g., quality data). For example, analytics device 240 may receive information identifying a data rate, a frames per second (FPS) measurement, an encoding type, a buffer time, an outage occurrence (e.g., an error in providing an item of content), an outage duration, an outage type, or the like. Based on receiving the log file from user device 250 rather than a server-side log file, analytics device 240 may correlate a user's decision not to continue accessing an item of content with poor playback quality, and may determine that the user's decision not to continue accessing the item of content may not result from the user not enjoying the item of content. In this way, analytics device 240 improves granularity of a user engagement determination relative to utilizing a server-side log file, thereby improving content recommendations and/or network performance, and reducing a utilization of memory resources. Moreover, analytics device 240 can alter playback parameters to improve playback quality to reduce a likelihood that a user decides not to continue accessing an item of content, thereby improving content delivery, advertisement delivery, and/or user experience. Additionally, or alternatively, analytics device 240 may receive content data relating to utilization of the content platform for a transaction (e.g., transaction data). For example, analytics device 240 may receive information identifying a purchase of an item of content via the content platform, a purchase of a product advertised via the content platform, or the like. Additionally, or alternatively, analytics device 240 may receive content data relating to one or more other events associated with user device 250 and/or the content platform (e.g., event data). For example, analytics device 240 may receive information indicating that a phone call was received or initiated during playback of content, that a calendar reminder was triggered during playback of content, that a text was sent or received during playback of content, or the like. Based on receiving the event data, analytics device 240 may correlate a user's decision not to continue accessing an item of content with an event, and may determine that the user's decision not to continue accessing the item of content may not result from the user not enjoying the item of content. Similarly, analytics device 240 may utilize future event data to select content, such as selecting an item of content with a particular duration that does not overlap with a calendar entry of a particular user device 250.

As further shown in FIG. 4, process 400 may include processing the content data (block 420). For example, analytics device 240 may process the content data. In some implementations, analytics device 240 may perform a set of processing operations on the content data to prepare the content data for analysis (e.g., to generate an analytical data model associated with user engagement). For example, analytics device 240 may perform multiple processing operations associated with filtering data that is to be analyzed for the analytical data model. In this way, analytics device 240 reduces a likelihood that erroneous data, anomalous data, or the like cause the analytical data model to poorly represent user engagement with content relative to utilizing raw content data.

In some implementations, analytics device 240 may perform a data cleansing operation for one or more portions of the content data. For example, analytics device 240 may identify a group of duplicate data entries regarding the same session of a particular user device 250 utilizing the content platform, and may remove the duplicate data entries. In this way, analytics device 240 reduces a utilization of processing resources (e.g., for processing the content data) and memory resources (e.g., for storing the content data) and/or reduces analysis errors relative to retaining both the first group of data entries and the second group of data entries.

Additionally, or alternatively, analytics device 240 may identify a group of anomalous values included in the content data, and may remove the group of anomalous values. For example, when a user utilizing user device 250 fails to stop playback of content before going to sleep, user device 250 may continue playback until the user awakes the next morning, resulting in a session time for a particular session satisfying a threshold period of time (e.g., an anomalous event associated with a threshold deviation from other events, such as other sessions or the like). In this case, analytics device 240 may remove a group of data entries relating to the particular session from the content data. Similarly, another user may utilize user device 250 for playback exceeding another threshold, such as 300 hours in a month, viewership duration in the top 1% of viewers, or the like, and analytics device 240 may remove a group of data entries relating to the other user from the content data. In this way, analytics device 240 reduces a likelihood that anomalous accessing patterns distort analysis of the content data relative to including anomalous data in the analysis.

Additionally, or alternatively, analytics device 240 may remove one or more other groups of data entries, such as data entries for which a device identifier is not available, data entries with erroneous values (e.g., a negative consumption duration value, a consumption duration value exceeding 24 hours for a single day, or multiple overlapping sessions via a single user device 250), data entries with limited predictive value (e.g., a group of data entries relating to a user login without corresponding data regarding viewership), or the like. Additionally, or alternatively, analytics device 240 may perform a validation procedure to determine that a particular state transition is not permitted, such as a state transition from a particular state to the same particular state, and may remove information identifying the state transition from the content data based on the particular state transition being in error.

Additionally, or alternatively, analytics device 240 may perform the data cleansing operation to add additional data entries to the content data. For example, analytics device 240 may determine that a particular group of data entries regarding a particular item of content is missing a genre identifier. In this case, analytics device 240 may perform a data mining technique to determine the genre identifier, an Internet search to determine the genre identifier, or the like. Similarly, analytics device 240 may determine that a first group of data entries received from a particular user device 250 fails to include information identifying a user. In this case, analytics device 240 may identify a second group of data entries from the particular user device 250 that includes a user identifier, and may associate the first group of data entries with the user identifier of the second group of data entries. In this way, analytics device 240 completes one or more groups of data entries, thereby permitting analysis to be performed on the one or more groups of data entries with a reduced likelihood of an analysis error relative to performing the analysis on incomplete groups of data entries.

In some implementations, analytics device 240 may process the content data to correlate data entries of multiple data sets included in the content data. For example, analytics device 240 may perform an enrichment procedure to merge viewership data, login data, category data, or the like (e.g., to generate a group of data entries identifying a login attempt, a session resulting from the login attempt, an item of content accessed during the session, and/or a genre of the item of content). In this way, analytics device 240 permits determinations of derived metrics that are associated with data obtained from multiple datasets. For example, analytics device 240 may determine a play-through rate representing a ratio of a consumption duration to a total content duration for an item of content.

In some implementations, analytics device 240 may process the content data to derive a set of business variables. For example, analytics device 240 may determine a set of content level metrics, a set of device level metrics, a set of session level metrics, or the like based on the content data. A content level metric may refer to a metric relating to a particular item of content. For example, analytics device 240 may determine, for a particular item of content, a viewership, a quantity of repeat playbacks, a play-through rate (e.g., for the particular item of content), or the like. In this way, analytics device 240 derives key performance indicators (KPIs) relating to user engagement with content. Additionally, or alternatively, analytics device 240 may determine, for a particular session, an exclusivity metric (e.g., whether the session included playback of a single type of content, such as content relating to a single genre or a single language), a play-through rate (e.g., for a particular session), a session length, or the like. In this way, analytics device 240 derives session characteristics for utilization in a cluster analysis of session characteristics. Additionally, or alternatively, analytics device 240 may determine, for a particular user device 250 and/or a particular user, an average consumption per session metric, an average quantity of days between sessions metric, a distribution of content playback (e.g., a distribution by genre, language, or region), or the like. In this way, analytics device 240 derives metrics for utilization in analysis of device and/or user patterns in content consumption and engagement with content.

In some implementations, analytics device 240 may segment the content data to permit validation to be performed on the analytical data model. For example, analytics device 240 may select a first subset of content data to be utilized for generating portions of the analytical data model and a second subset of content data to be utilized to validate the portions of the analytical data model. In this way, analytics device 240 facilitates utilizing unstructured learning (e.g., machine learning) techniques to generate the analytical data model.

As further shown in FIG. 4, process 400 may include analyzing the content data to create an analytical data model relating to user engagement with content based on processing the content data (block 430). For example, analytics device 240 may analyze the content data to create the analytical data model relating to user engagement with content based on processing the content data. The analytical data model may refer to a set of layered analyses performed on the content data (e.g., at the content level, device level, or session level), such as to identify clusters of users associated with sessions of similar characteristics, to determine user engagement scores for users, to determine a popularity of items of content, or the like.

In some implementations, analytics device 240 may perform a layer of analysis, of the layered analysis, relating to session level metrics. For example, analytics device 240 may perform a univariate analysis procedure of session level metrics to identify a set of minimum values, mean values, maximum values, median values, or standard deviations, and may validate the session level metrics, such as by determining that variance for the session level metrics satisfies a variance threshold, removing outlier session level metrics, or the like. Additionally, or alternatively, analytics device 240 may perform a bivariate analysis procedure of session level metrics to identify one or more session level metric correlations (e.g., identify a first subset of session level metrics that are associated with a threshold correlation to a second subset of session level metrics), and may remove one or more session level metrics based on the one or more session level metric correlations. For example, analytics device 240 may remove the second subset of session level metrics based on the first subset of session level metrics satisfying the threshold correlation. In this way, analytics device 240 reduces a utilization of memory and/or processing resources relative to utilizing correlated session level metrics.

Additionally, or alternatively, analytics device 240 may perform a variable reduction procedure on the session level metrics. For example, based on a type of layered analysis being performed, analytics device 240 may remove one or more session level metrics not relating to the type of layered analysis. In this case, when the type of layered analysis relates to session characteristic of television viewers, analytics device 240 may remove session level metrics relating to transactions (e.g., to purchase movies). Additionally, or alternatively, analytics device 240 may perform a data standardization procedure. For example, analytics device 240 may normalize multiple session level metrics based on corresponding mean and standard deviation values, determined based on the univariate analysis, to permit multivariate analysis of multiple different session level metrics.

Additionally, or alternatively, analytics device 240 may perform a clustering technique on the session level metrics to generate the layer of analysis relating to session level metrics. For example, analytics device 240 may perform K-means clustering on the session level metrics (e.g., using a machine learning technique) to identify clusters of common session characteristics (e.g., common characteristics relating to a set of session level metrics). In this case, analytics device 240 may classify users based on a type of cluster to which the user's sessions are assigned, and may target the user for content, advertising, playback parameter alteration based on the cluster to which the user's sessions are assigned. For example, a first user associated with relatively short sessions may receive an advertisement when logging in to the content platform and a second user associated with relatively long sessions may receive one or more advertisements inserted into content playback. In this way, analytics device 240 improves targeting of content and/or user experience relative to server-side log file based determinations. In some implementations, analytics device 240 may automatically generate descriptions of the set of clusters based on the session level metrics and a natural language generation tool. For example, a first cluster of sessions relates to session durations lasting less than a threshold amount of time, analytics device 240 may identify the cluster as "Short Video Viewers." Similarly, when a second cluster of sessions relates to incomplete accessing of items of content, analytics device 240 may automatically identify the cluster as "Partial Content Viewers."

In some implementations, analytics device 240 may perform a layer of analysis, of the layered analysis, relating to device level metrics. For example, analytics device 240 may perform a set of analysis procedures (e.g., using a machine learning technique), such as a univariate analysis procedure, a bivariate analysis procedure, a data reduction procedure, a data standardization procedure, or the like to analyze device level metrics, and may perform a recency, frequency, and monetary (RFM) data analysis technique to identify user engagement scores based on device level metrics. For example, analytics device 240 may analyze one or more device level metrics to generate an RFM score, relating to user engagement, for a set of user devices 250 and/or users.

Additionally, or alternatively, analytics device 240 may classify a set of users into a set of groups based on RFM scores. For example, analytics device 240 may utilize a cluster analysis to automatically segment users into low engagement users, high engagement users, accelerator users, or the like. In this case, analytics device 240 may target a particular user for content, advertisement, playback parameter alteration, or the like based on an assigned segment. For example, an accelerator user (e.g., who is relatively unlikely to stop using the content platform) may receive multiple advertisements inserted into playback of an item of content while a low engagement user (e.g., who is relatively more likely to stop using the content platform) may receive relatively infrequent advertisements. In this way, analytics device 240 improves targeting of users for content, advertisements, playback parameter alterations, or the like relative to server-side log file determinations.

In some implementations, analytics device 240 may analyze the content data to automatically identify a set of characteristics of each user engagement segment. For example, analytics device 240 may determine that low engagement viewers are associated with accessing videos with a total duration less than a threshold and are associated with accessing content without a genre preference. Similarly, analytics device 240 may determine that high engagement users are associated with weekday accessing of content and are associated with a genre preference of dramatic content. In this case, analytics device 240 may automatically provide relatively shorter videos to low engagement users and dramatic videos to high engagement users.

In some implementations, analytics device 240 may perform a layer of analysis, of the layered analysis, relating to content level metrics and device level metrics. For example, analytics device 240 may perform a set of analysis procedures, such as a univariate analysis procedure, a bivariate analysis procedure, a variable reduction procedure, a logistic regression procedure, to generate a logistic regression model for predicting relevancy of particular type of content to a particular user based on a genre of the particular content (e.g., a genre engagement score). Additionally, or alternatively, analytics device 240 may utilize a machine learning technique to identify a popularity of an item of content (e.g., based on content level metrics) to predict relevancy of the item of content to users, to determine whether to provide the item of content, or the like.

In some implementations, analytics device 240 may validate one or more layers of analysis of the analytical data model. For example, when analytics device 240 utilizes a first group of data entries associated with a first group of users (e.g., a particular percentage of users or a particular quantity of users) to perform the cluster analysis, analytics device 240 may attempt to assign a second group of users to clusters based on a corresponding second group of data entries. In this case, analytics device 240 may determine whether characteristics associated with the clusters of sessions to which the second group of users is assigned correspond to characteristics of sessions of the second group of users. For example, analytics device 240 may determine, based on the first group of data entries, that sessions including less than 5 minutes of playback tend to be associated with comedy television. In this case, analytics device 240 may determine whether, based on the second group of data entries, the sessions including less than 5 minutes of playback were associated with comedy television.

In some implementations, analytics device 240 may determine that the analytical data model is valid. For example, analytics device 240 may determine that a validation score associated with testing the layers of analysis of the analytical data model with a portion of content data satisfy a threshold, and may store the analytical data model for utilization in performing classifications of users, for targeting of content or advertising, for altering playback parameters, or the like. Additionally, or alternatively, analytics device 240 may determine that the analytical data model is not valid, and may perform another analysis of the content data to generate a new analytical data model for validation. In this case, analytics device 240 may alter one or more parameters relating to processing the content data (e.g., a threshold for removing a data entry), analyzing the content data (e.g., a different quantity of clusters for a clustering analysis), or the like.

As further shown in FIG. 4, process 400 may include providing information associated with user engagement (block 440). For example, analytics device 240 may provide information associated with user engagement. In some implementations, analytics device 240 may provide information associated with the analytical data model and relating to user engagement. For example, analytics device 240 may provide information identifying the set of clusters of session characteristics. In this case, analytics device 240 may provide information identifying, for a particular cluster, a genre preference, a consumption pattern, a content popularity, or the like. In some implementations, analytics device 240 may provide, with regard to a particular user, information identifying a predicted characteristic associated with the particular user based on assigning the particular user to a particular cluster. For example, analytics device 240 may determine, based on content data relating to the particular user, that one or more sessions associated with the particular user correspond to the particular cluster, and may provide information identifying one or more characteristics of the particular cluster.

In some implementations, analytics device 240 may perform a particular action based on identifying the particular cluster for the user. For example, analytics device 240 may determine that, for other users assigned to the cluster, user engagement increased when bandwidth assigned to the other users was increased, and may alter a network configuration to assign additional bandwidth to providing content to user device 250 for playback to the particular user to increase user engagement for the particular user. Additionally, or alternatively, based on a characteristic of the user (e.g., associated with the particular cluster for the user), analytics device 240 may determine a targeting of advertisements or content associated with causing the user to utilize the content platform more frequently, and may implement the targeting (e.g., may cause an advertisement or an item of content to be provided). In this way, analytics device 240 improves user experience with a content platform, targeting of the particular user for particular content (e.g., based on increasing a likelihood that the particular enjoys the particular content), or the like relative to operating a content platform based on server-side information.

Additionally, or alternatively, analytics device 240 may provide information identifying an RFM score of the user (e.g., a user engagement value). For example, analytics device 240 may provide, for display via a user interface of client device 210, information identifying users associated with a low engagement segment, a high engagement segment, an accelerator segment, or the like. In some implementations, analytics device 240 may generate a recommendation based on an RFM score. For example, analytics device 240 may identify a particular frequency of advertisements for a particular user based on the RFM score, and may cause advertisements to be provided to user device 250 for display to the particular user with the particular frequency. Additionally, or alternatively, analytics device 240 may select a type of content to provide to the particular user (e.g., a particular duration, a particular category, or a particular genre) based on the RFM score, and may cause the selected type of content to be provided via the content platform. In this way, analytics device 240 increases a likelihood that a user enjoys content provided via the content platform relative to selecting content based on information from a server-side log file. Moreover, analytics device 240 reduces a likelihood that the user rejects the content and requests different content causing excessive utilization of network resources, processing resources, or the like.

Additionally or alternatively, analytics device 240 may provide information identifying a genre engagement score relating to a likelihood that a particular user will enjoy a particular genre of content (e.g., for display via client device 210). In some implementations, analytics device 240 may select content for playback to a particular user based on a particular genre engagement score. For example, analytics device 240 may generate a playlist of content that includes content associated with genres for which the particular genre engagement score satisfies a threshold, and may cause items of content of the playlist to be provided for playback via the content platform. Based on generating the playlists based on user engagement, analytics device 240 increases a likelihood that the user watches the entire playlist, thereby improving advertisement targeting relative to a playlist to which the user does not pay attention, and reducing utilization of network resources and processing resources relative to a playlist that the user rejects resulting in obtaining and providing another playlist of content.

Additionally, or alternatively, analytics device 240 may provide information identifying a popularity of an item of content. For example, analytics device 240 may generate a visualization relating to a KPI of one or more items of content, and may provide the visualization for display. In this case, analytics device 240 may provide, for display via a user interface of client device 210, a particular visualization identifying a quantity of users that watched a particular item of content, a quantity of users that stopped watching the particular item of content before completion (e.g., not as a result of an interrupting event, such as a phone call or a calendar appointment), or the like. In some implementations, analytics device 240 may perform an action based on the popularity of the item of content. For example, analytics device 240 may schedule an item of content with a threshold popularity for broadcasting, thereby reducing network utilization relative to unicasting the item of content to multiple content platforms operating on multiple user devices 250. Additionally, or alternatively, analytics device 240 may cause an item of content failing to satisfy a threshold popularity to be removed from a repository storing items of content, thereby reducing utilization of memory resources relative to maintaining all items of content in storage.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5E are diagrams of an example implementation 500 relating to example process 400 shown in FIG. 4. FIGS. 5A-5E show an example of determining user engagement with content.

Figure 5A:
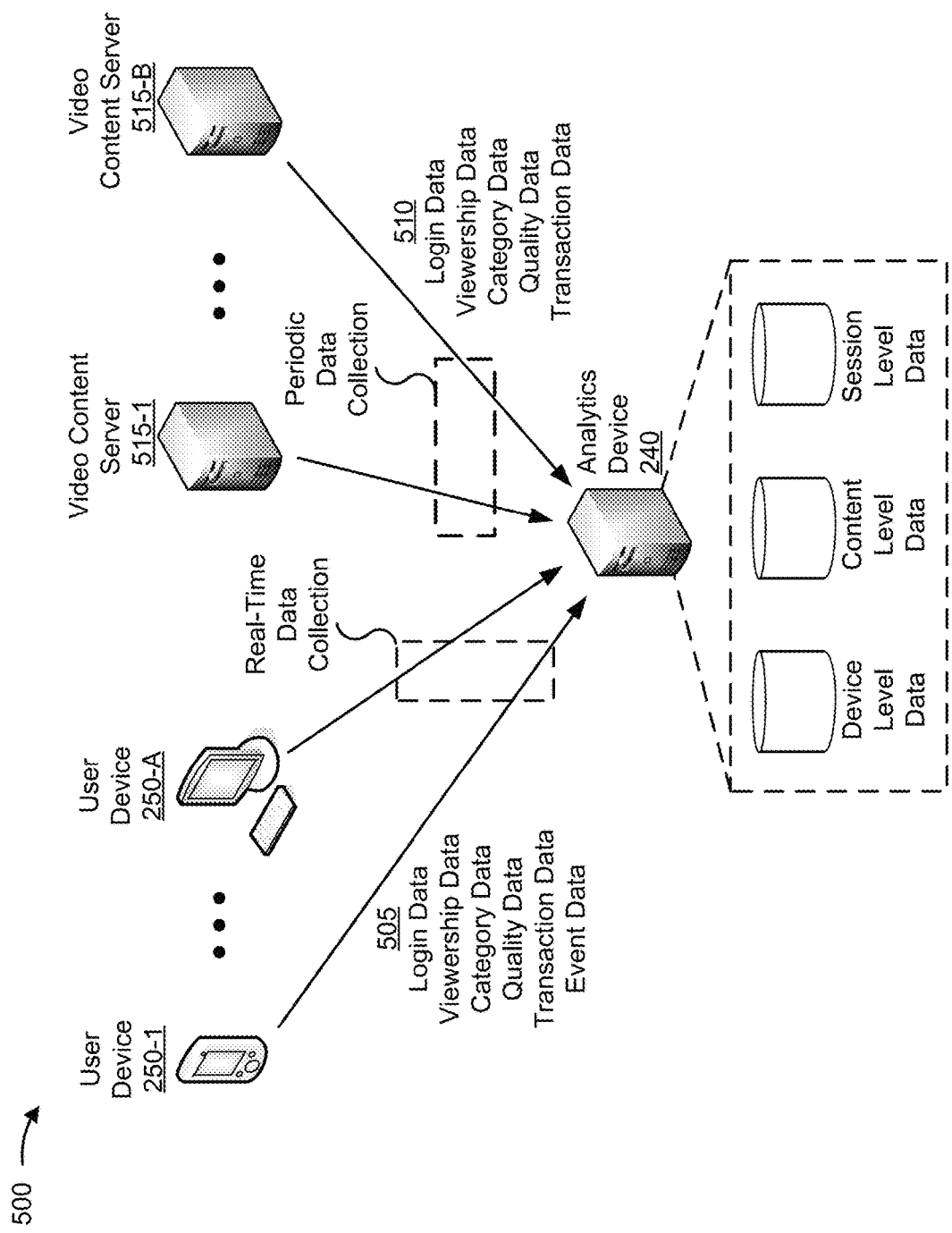

As shown in FIG. 5A, and by reference number 505, analytics device 240 performs real-time data collection (e.g., analytics device 240 causes data collection to be triggered when user device 250 detects a change to a metric, such as a playback outage or a change to which content is provided) of content data from a group of user devices 250-1 through 250-A that are operating a video platform (e.g., a particular type of content platform). As shown by reference number 510, analytics device 240 performs periodic data collection of content data from a group of video content servers 515-1 through 515-B associated with providing video content via the video platform. Analytics device 240 stores the data via a group of repositories, such as a repository associated with device level metrics, a repository associated with content level metrics, a repository associated with session level metrics, or the like.

Figure 5B:
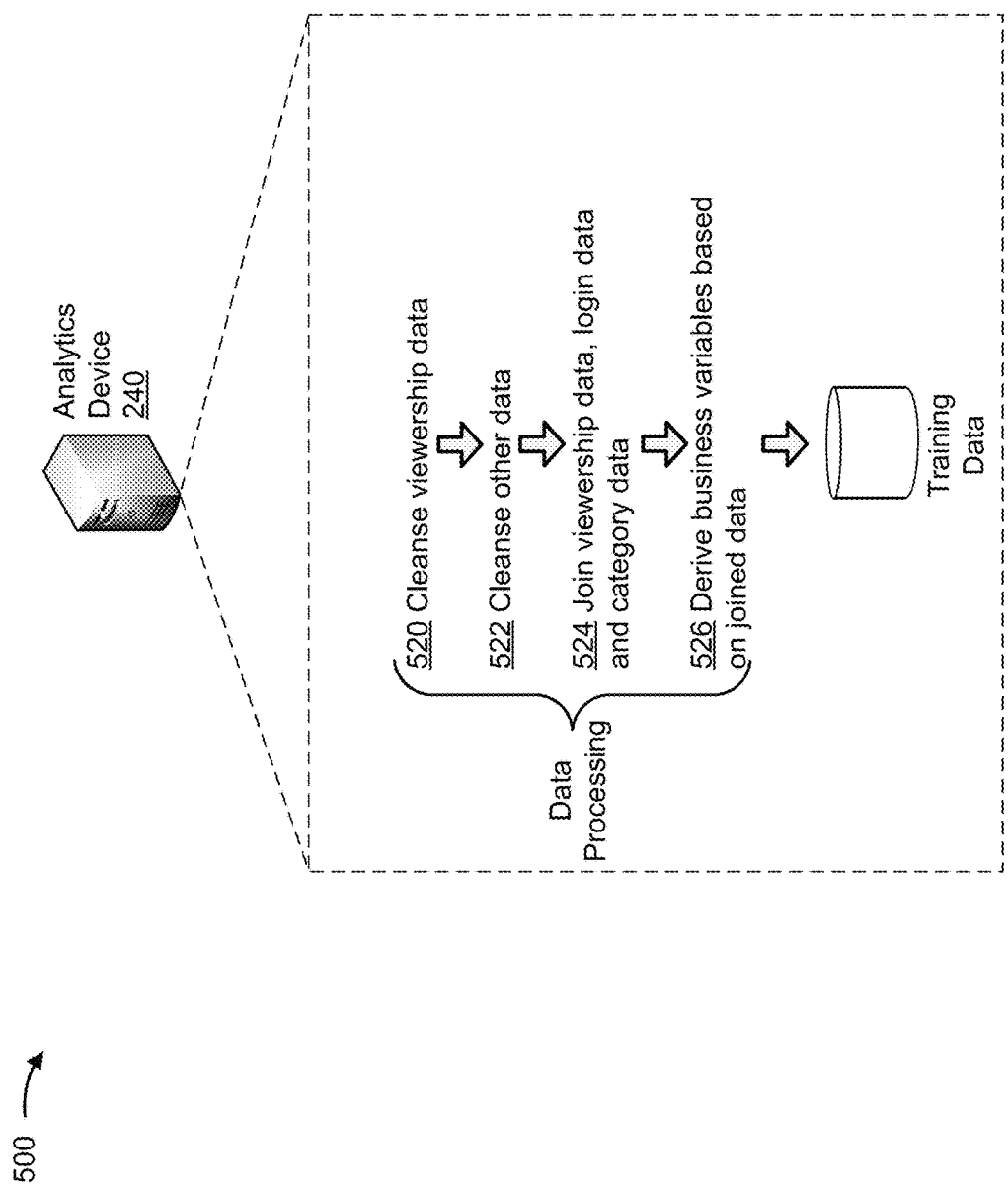

As shown in FIG. 5B, and by reference numbers 520-526, analytics device 240 performs a set of data processing operations on the content data received from the group of user devices 250 and the group of video content servers 515. As shown by reference number 520, analytics device 240 performs a cleansing operation on viewership data, such as by identifying a group of data entries corresponding to an anomalous user (e.g., a particular user device 250 receiving greater than 15 hours of video content per day) and removing the group of data entries from the content data. As shown by reference number 522, analytics device 240 performs a cleansing operation on other data of the content data (e.g., login data, category data, quality data, or transaction data), such as by identifying one or more users with login information for the video platform but who have failed to utilize the video platform within the last 3 months and removing data entries relating to the one or more users.

As further shown in FIG. 5B, and by reference number 524, analytics device performs a joining of viewership data, login data, and category data, such as by locating corresponding user identifiers in the viewership data and login data, and merging the viewership data and login data based on the corresponding user identifiers. Similarly, analytics device 240 merges category data with the viewership data and login data to generate joined data that identifies characteristics of video content consumed by users. As shown by reference number 526, analytics device 240 derives business variables based on the joined data. For example, analytics device 240 determines device level metrics, session level metrics, and content level metrics based on data entries relating to viewership by users that have performed a login within the previous 3 months.

Figure 5C:
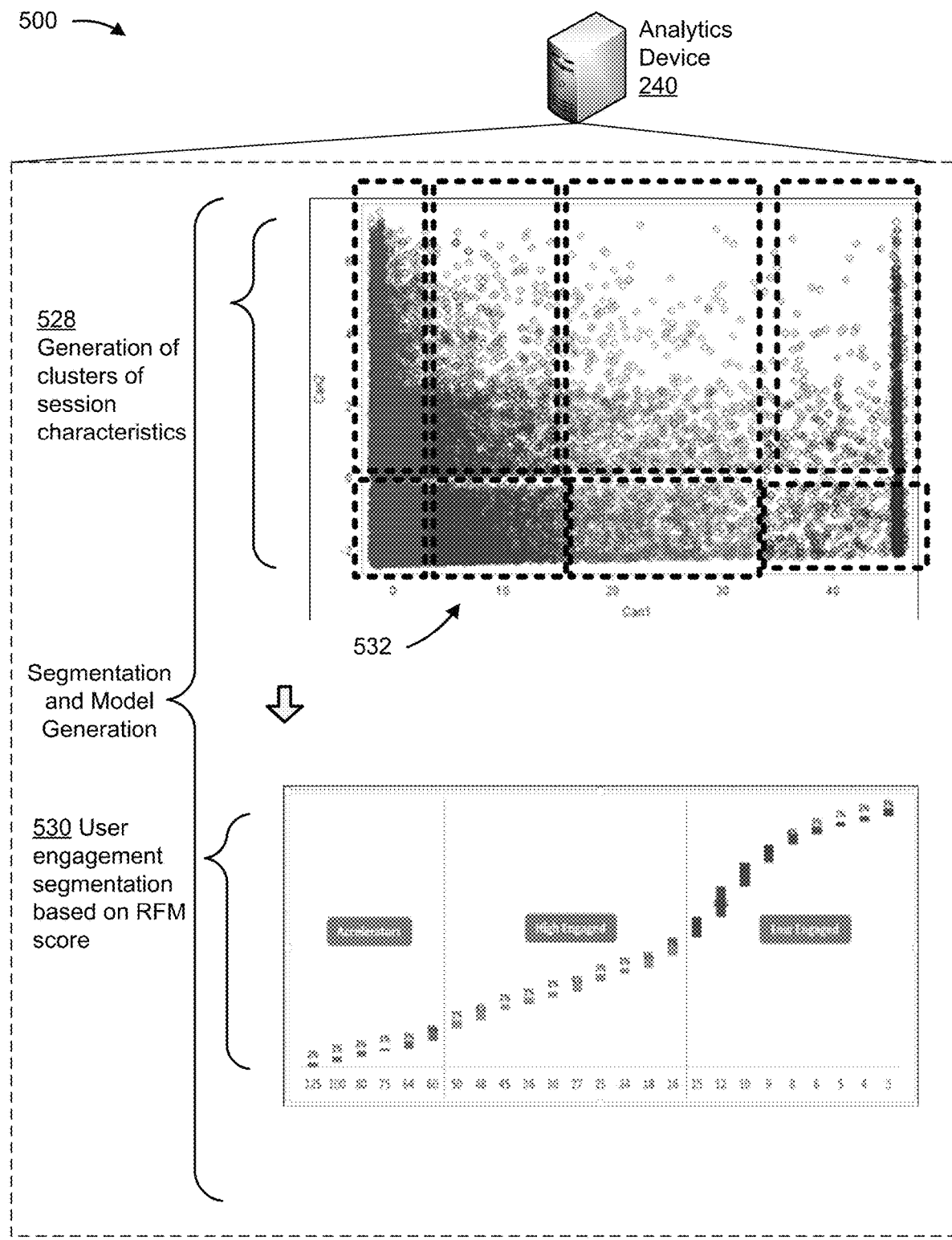

As shown in FIG. 5C, and by reference numbers 528 and 530, analytics device 240 analyzes the joined content data to perform segmentation and model generation relating to an analytical data model of user engagement with content. As shown by reference number 528, analytics device 240 generates a set of clusters 532 to categorize characteristics of sessions of viewership. As shown by reference number 530, analytics device 240 segments users based on RFM scores, such as accelerator users, high engaged users, and low engaged users.

Figure 5D:
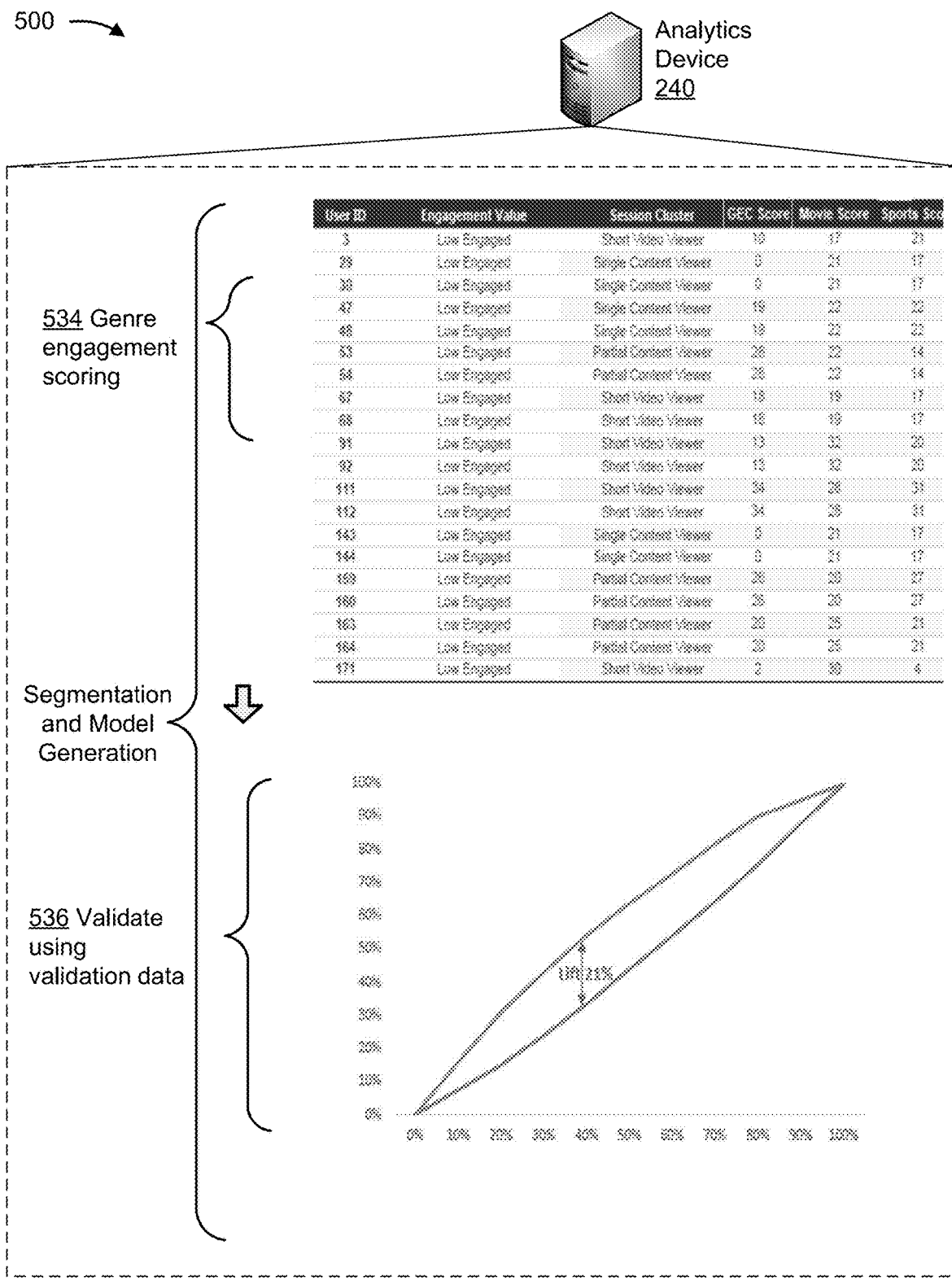

As shown in FIG. 5D, and by reference number 534, analytics device 240 determines genre engagement scores for a group of users (e.g., low engaged users), such as a general entertainment content (GEC) score, a Movie score, and a Sports score. As shown by reference number 536, analytics device 240 validates the analytical data model using validation data (e.g., a portion of the content data). For example, analytics device 240 determines that a lift value of 15% for the analytical data model satisfies a threshold, indicating that the analytical data model permits 15% improved targeting of users based on the analytical data model than is achieved by random targeting of users.

As shown in FIG. 5E, analytics device 240 provides a user interface for display. Analytics device 240 provides, via the user interface, information identifying a real-time set of metrics of user engagement with content for a particular period (e.g., a previous week), such as information identifying a quantity of unique viewers, a quantity of repeat viewers, a play-through rate (of playback), or the like. In this way, analytics device 240 provides information indicating a popularity of items of content. Analytics device 240 provides, via the user interface, information regarding a particular selected user. The information regarding the particular selected user indicates an RFM score for the user, a user type (e.g., a cluster of session characteristics to which the user is assigned), and a set of genre engagement scores. The information regarding the particular selected user identifies a set of actions identified by analytics device 240 for the particular selected user, such as a first action of altering an advertisement frequency to cause a new advertisement to be provided every 22 minutes during a content accessing session and a playlist of video content to be automatically provided to the particular user. As shown by reference number 538, analytics device 240 automatically causes the set of actions to be implemented (e.g., the advertisement frequency to be altered and items of content of the playlist to be provided to user device 250 to cause user device 250 to provide the items of content via the video platform.

As indicated above, FIGS. 5A-5E are provided merely as an example. Other examples are possible and may differ from what was described with regard to FIGS. 5A-5E.

Figure 6:
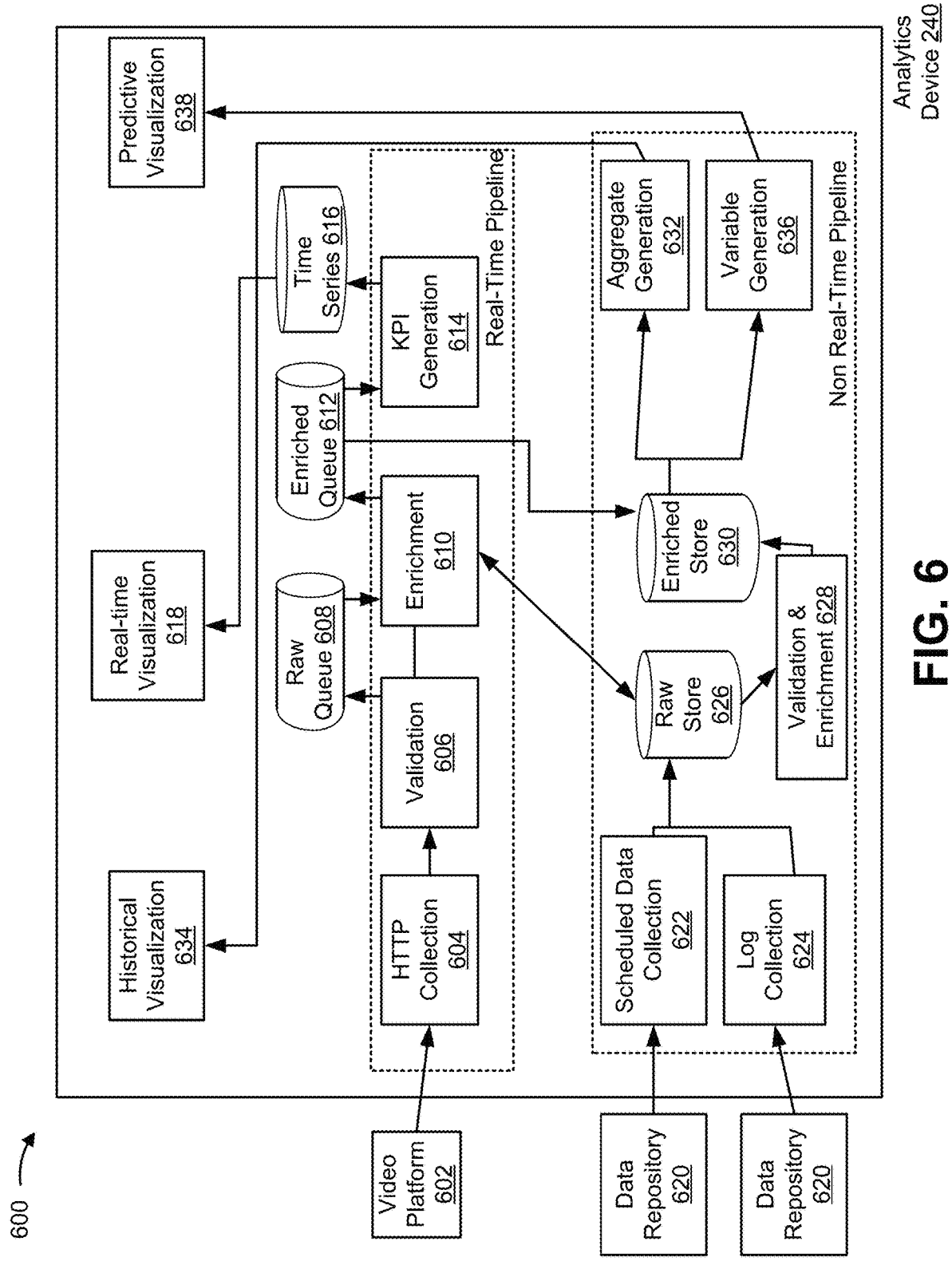
FIG. 6 is a diagram of another example implementation relating to the example process shown in FIG. 4.

FIG. 6 is a diagram of an example implementation 600 relating to example process 400 shown in FIG. 4. FIG. 6 shows an example of determining user engagement with content.

As shown in FIG. 6, and by reference number 602, data is provided from a video platform (e.g., associated with user device 250) via a Hypertext Transfer Protocol (HTTP) collection module 604. For example, user device 250 may identify a state transition from a first state to a second state (e.g., utilizing a JavaScript library of state calls), and may provide information identifying the state transition. Analytics device 240 may utilize validation module 606 to validate the data. Validating the data may include determining that the identified state transition is valid (e.g., the first state is permitted to transfer to the second state), tagging the data as a state transition, or the like. Analytics device 240 may transfer the data to raw queue 608 and to enrichment module 610. Enrichment module 610 may associate metadata with the data. For example, enrichment module 610 may associate information associated with a server log file (e.g., a content identifier, a content type, or a content duration) or information associated with user device 250 (e.g., an account identifier, a content identifier, or a location identifier) with the data. Analytics device 240 may transfer the enriched data to enriched queue 612 and to key performance indicator (KPI) generation module 614. KPI generation module 614 may identify one or more metrics based on the enriched data, such as a quality of engagement metric, a video consumption metric, or the like. For example, KPI generation module 614 may process the enriched data to create a portion of an analytical data model. Analytics device 240 may transfer the one or more metrics to time series data repository 616 and to a real-time visualization module 618, which may cause the one or more metrics to be provided via a user interface. In this way, analytics device 240 utilizes a set of modules to perform real-time data collection and provide analytics for display.

As further shown in FIG. 6, analytics device 240 may obtain data (e.g., reference data, such as a title of an item of content or a genre of an item of content) from one or more data repositories 620 using a scheduled data collection module 622 and/or a log collection module 624. In some implementations, analytics device 240 may obtain the reference data periodically, such as each day, each week, or the like. Analytics device 240 may transfer the data to a raw store repository 626 and to a validation and enrichment module 628. For example, analytics device 240 may associate the data with real-time data collected from video platform 602 (e.g., from user device 250), such as data indicating one or more state transitions observed during playback of an item of content. Analytics device 240 may transfer the enriched data to enriched store repository 630 (as well as enriched data obtained from video platform 602). Analytics device 240 may transfer the enriched data to aggregate generation module 632 for generation of metrics related to a user engagement with an item of content (e.g., based on an analytical data model), and to historical visualization module 634 which may cause the metrics to be provided for display via a user interface. Similarly, analytics device 240 may transfer the enriched data to variable generation module 636 which may generate an analytical data model for generating one or more predictive metrics (e.g., relating to predicting whether a user will be engaged with an item of content). Analytics device 240 may transfer the one or or more predictive metrics to predictive visualization module 638, which may cause the one or more predictive metrics to be included via a user interface.

As indicated above, FIG. 6 is provided merely as an example. Other examples are possible and may differ from what was described with regard to FIG. 6.

In this way, analytics device 240 utilizes content data received from a set of user devices 250 to determine user engagement with content and manage a content platform user interface. Analytics device 240 improves targeting of users for content and advertisements utilizing the content data received from the set of user devices 250 relative to utilizing server-side log files. Moreover, analytics device 240 reduces utilization of network resources, processing resources, and/or memory resources based on more accurately determining content preferences of a user, popularity of items of content, or the like.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A non-transitory computer-readable medium storing instructions, the instructions comprising:
    one or more instructions that, when executed by one or more processors, cause the one or more processors to:
        obtain content data from a group of user devices,
            the content data including data entries regarding playback of content, and
            the content data relating to a content platform associated with providing playback of the content via the group of user devices;
        process the data entries by:
            removing a group of the data entries from the content data,
                the group of the data entries corresponding to at least one of:
                    an anomalous user satisfying a threshold quantity of playback time per day, or
                    an anomalous event associated with a threshold deviation from other events, and
            adding one or more additional entries to complete an incomplete group of the data entries,
                the one or more additional entries including at least one of:
                    information about the content, or
                    information identifying one or more users of the group of user devices;
        analyze, based on removing the group of the data entries from the content data and adding the one or more additional entries, the data entries to determine data metrics associated with user engagement with the content;
        set, based on determining the data metrics and for a particular user associated with a particular user device of the group of user devices, a frequency of playback for advertising content during a content accessing session to a particular frequency; and
        cause the advertising content to be provided at the particular frequency via the content platform of the particular user device.

2. The non-transitory computer-readable medium of claim 1, where the one or more instructions, when executed by the one or more processors, further cause the one or more processors to:
    cause an alteration to a network configuration based on the data metrics; and where the one or more instructions, that cause the one or more processors to cause the advertising content to be provided via the content platform, cause the one or more processors to:
transmit the advertising content to the particular user device after causing the alteration to the network configuration.

3. The non-transitory computer-readable medium of claim 1, where the one or more instructions, when executed by the one or more processors, further cause the one or more processors to:
generate a user interface including information associated with the data metrics; and
cause the user interface to be provided for display via a client device.

4. The non-transitory computer-readable medium of claim 1, where the one or more instructions, when executed by the one or more processors, further cause the one or more processors to:
assign the particular user to a particular cluster associated with the data metrics based on one or more content playback sessions for the particular user corresponding to a set of content playback sessions of the particular cluster; and
select a particular item of content for playback based on assigning the particular user to the particular cluster.

5. The non-transitory computer-readable medium of claim 1, where the one or more instructions, when executed by the one or more processors, further cause the one or more processors to:
determine a popularity of a particular item of content based on the data metrics; and
select the particular item of content for playback based on the popularity of the particular item of content.

6. The non-transitory computer-readable medium of claim 1, where the one or more instructions, when executed by the one or more processors, further cause the one or more processors to:
generate an analytical data model based on analyzing the data entries; and
identify a cluster of users based on performing a set of layered analysis using the analytical data model.

7. The non-transitory computer-readable medium of claim 1, where the one or more instructions, that cause the one or more processors to obtain the content data from the group of user devices, cause the one or more processors to:
obtain the content data from the group of user devices in real-time.

8. A device, comprising:
a memory; and
one or more processors to:
obtain content data from a group of user devices,
the content data including data entries regarding playback of content, and
the content data relating to a content platform associated with providing playback of the content via the group of user devices;
process the data entries by:
removing a group of the data entries from the content data,
the group of the data entries corresponding to at least one of:
an anomalous user satisfying a threshold quantity of playback time per day, or
an anomalous event associated with a threshold deviation from other events, and
adding one or more additional entries to complete an incomplete group of data entries,
the one or more additional entries including at least one of:
information about the content, or
information identifying one or more users of the group of user devices;
analyze, based on removing the group of the data entries from the content data and adding the one or more additional entries, the data entries to determine data metrics associated with user engagement with the content;
set, based on determining the data metrics and for a particular user associated with a particular user device of the group of user devices, a frequency of playback for advertising content during a content accessing session to a particular frequency; and
cause the advertising content to be provided at the particular frequency via the content platform of the particular user device.

9. The device of claim 8, where the one or more processors are further to:
cause an alteration to a network configuration based on the data metrics; and
where the one or more processors, when causing the advertising content to be provided via the content platform, cause the one or more processors to:
transmit the advertising content to the particular user device after causing the alteration to the network configuration.

10. The device of claim 8, where the one or more processors are further to:
generate a user interface including information associated with the data metrics; and
cause the user interface to be provided for display via a client device.

11. The device of claim 8, where the one or more processors are further to:
assign the particular user to a particular cluster associated with the data metrics based on one or more content playback sessions for the particular user corresponding to a set of content playback sessions of the particular cluster; and
select a particular item of content for playback based on assigning the particular user to the particular cluster.

12. The device of claim 8, where the one or more processors are further to:
determine a popularity of a particular item of content based on the data metrics; and
select the particular item of content for playback based on the popularity of the particular item of content.

13. The device of claim 8, where the one or more processors are further to:
generate an analytical data model based on analyzing the data entries; and
identify a cluster of users based on performing a set of layered analysis using the analytical data model.

14. The device of claim 8, where the one or more processors, when obtaining the content data from the group of user devices, are to:
obtain the content data from the group of user devices in real-time.

15. A method, comprising:
obtaining, by a device, content data from a group of user devices,
the content data including data entries regarding playback of content, and the content data relating to a content platform associated with providing playback of the content via the group of user devices;

processing, by the device, the data entries by:
  removing a group of the data entries from the content data,
    the group of the data entries corresponding to at least one of:
      an anomalous user satisfying a threshold quantity of playback time per day, or
      an anomalous event associated with a threshold deviation from other events, and
  adding one or more additional entries to complete an incomplete group of the data entries,
    the one or more additional entries including at least one of:
      information about the content, or
      information identifying one or more users of the group of user devices;

analyzing, by the device, based on removing the group of the data entries, and based on adding the one or more additional entries, the data entries to determine data metrics associated with user engagement with the content;

setting, by the device, based on determining the data metrics, and for a particular user associated with a particular user device of the group of user devices, a frequency of playback for advertising content during a content accessing session to a particular frequency; and causing, by the device, the advertising content to be provided at the particular frequency via the content platform of the particular user device.

16. The method of claim 15, further comprising:
causing an alteration to a network configuration based on the data metrics; and
where causing the advertising content to be provided via the content platform comprises:
  transmitting the advertising content to the particular user device after causing the alteration to the network configuration.

17. The method of claim 15, further comprising:
generating a user interface including information associated with the data metrics; and
causing the user interface to be provided for display via a client device.

18. The method of claim 15, further comprising:
assigning the particular user to a particular cluster associated with the data metrics based on one or more content playback sessions for the particular user corresponding to a set of content playback sessions of the particular cluster; and
selecting a particular item of content for playback based on assigning the particular user to the particular cluster.

19. The method of claim 15, further comprising:
generating an analytical data model based on analyzing the data entries; and
identifying a cluster of users based on performing a set of layered analysis using the analytical data model.

20. The method of claim 15, where obtaining the content data from the group of user devices comprises:
obtaining the content data from the group of user devices in real-time.

* * * * *